(12) United States Patent
Hong et al.

(10) Patent No.: US 8,457,895 B2
(45) Date of Patent: Jun. 4, 2013

(54) MOBILE VEHICLE NAVIGATION METHOD AND APPARATUS THEREOF

(75) Inventors: Won-Gil Hong, Gyeonggi-Do (KR); Jung-Hak Kyu, Seoul (KR); Ilyun-Dok Park, Gyeonggi-Do (KR); Jung-Ilyun Hwang, Seoul (KR); Jong-Sun Park, Seoul (KR); Jin-Seok Choi, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 336 days.

(21) Appl. No.: 12/413,988

(22) Filed: Mar. 30, 2009

(65) Prior Publication Data

US 2010/0082230 A1 Apr. 1, 2010

(30) Foreign Application Priority Data

Oct. 1, 2008 (KR) .................. 10-2008-0096832

(51) Int. Cl.
 *G01C 21/3407* (2006.01)
(52) U.S. Cl.
 USPC .......................................... 701/540; 400/425
(58) Field of Classification Search
 USPC .............. 701/200, 205, 209, 211, 213, 400, 701/425, 484, 522, 537, 538, 540; 340/995.1, 340/995.13, 995.24, 996
 See application file for complete search history.

(56) References Cited

U.S. PATENT DOCUMENTS

| | | | | | |
|---|---|---|---|---|---|
| 5,243,529 | A | * | 9/1993 | Kashiwazaki | 701/208 |
| 5,568,390 | A | * | 10/1996 | Hirota et al. | 701/201 |
| 5,648,769 | A | * | 7/1997 | Sato et al. | 340/988 |
| 6,088,642 | A | * | 7/2000 | Finkelstein et al. | 701/49 |
| 6,363,323 | B1 | * | 3/2002 | Jones | 701/213 |
| 6,944,539 | B2 | * | 9/2005 | Yamada et al. | 701/211 |
| 7,659,810 | B2 | * | 2/2010 | Flick | 340/441 |
| 7,941,753 | B2 | * | 5/2011 | Meisels et al. | 715/751 |
| 2001/0053956 | A1 | * | 12/2001 | Ohishi et al. | 701/209 |
| 2003/0128103 | A1 | * | 7/2003 | Fitzpatrick et al. | 340/425.5 |
| 2004/0203644 | A1 | * | 10/2004 | Anders et al. | 455/414.1 |
| 2004/0204824 | A1 | * | 10/2004 | Naito et al. | 701/200 |
| 2006/0271290 | A1 | * | 11/2006 | Li | 701/213 |
| 2007/0044037 | A1 | * | 2/2007 | Amari et al. | 715/817 |
| 2008/0139245 | A1 | * | 6/2008 | Huh et al. | 455/556.2 |

* cited by examiner

*Primary Examiner* — Paul N Dickson
*Assistant Examiner* — Timothy Wilhelm
(74) *Attorney, Agent, or Firm* — Birch, Stewart, Kolasch & Birch, LLP

(57) ABSTRACT

A device and method for managing a schedule of one or more events in a navigation device of a vehicle. The method includes determining by the navigation device that a predetermined vehicle event has occurred; receiving the schedule by the navigation device based upon the step of determining; and issuing an alert by the navigation device that a scheduled event has passed, is occurring or will occur within a predetermined time.

21 Claims, 14 Drawing Sheets

MOBILE VEHICLE NAVIGATION METHOD AND APPARATUS THEREOF

CROSS REFERENCE TO RELATED APPLICATIONS

The present disclosure relates to subject matter contained in priority Korean Application No. 10-2008-0096832, filed on Oct. 1, 2008, which is herein expressly incorporated by reference in its entirety.

BACKGROUND OF THE INVENTION

1. Field of the Invention

The present invention relates to a mobile vehicle navigation method and apparatus.

2. Description of the Related Art

In general, a vehicle navigation device is a device for generating road guidance information based on a GPS (Global Positioning System) or other navigation signal and map information and providing the road guidance information to a user.

FIG. 1 is a schematic block diagram of a related art vehicle navigation system.

As shown in FIG. 1, the related art vehicle navigation system includes: an information providing center 3 providing traffic information; and a vehicle navigation device 4 mounted in a vehicle, receiving traffic information via a wireless communication network, and providing a road guidance service based on a GPS signal and the traffic information received via an artificial satellite 1.

SUMMARY OF THE INVENTION

In order to various deficiencies and limitations associated with the related art vehicle navigation system, the various features described herein have been conceived.

An aspect of the invention includes a vehicle navigation method including: determining whether or not an event for notifying about schedule information occurs; receiving the schedule information when the event occurs; and if there is a schedule for a current date in the schedule information, notifying about the schedule.

An aspect of the invention includes a vehicle navigation method including: receiving schedule information when a vehicle starts; and if there is a schedule for a current data in the schedule information, notifying about the schedule.

An aspect of the invention includes a vehicle navigation method including: receiving schedule information when a door of a vehicle is open; and if there is a schedule for a current data in the schedule information, notifying about the schedule.

An aspect of the invention includes a vehicle navigation method including: receiving schedule information when a security belt of a vehicle is in use; and if there is a schedule for a current data in the schedule information, notifying about the schedule.

An aspect of the invention includes a vehicle navigation method including: receiving schedule information when the weight of a user is detected; and if there is a schedule for a current data in the schedule information, notifying about the schedule.

An aspect of the invention includes a vehicle navigation method including: reading schedule information from a mobile phone via a wireless communication network if an event occurs.

An aspect of the invention includes a vehicle navigation method including: receiving schedule information from a Web server via a wireless communication network if an event occurs.

An aspect of the invention includes a vehicle navigation method including: detecting location information from schedule information; and setting a place corresponding to the location information as a destination.

An aspect of the invention includes a vehicle navigation method including: detecting the amount of fuel of a vehicle; if the vehicle cannot travel to a destination from a current location of the vehicle with the amount of fuel of the vehicle, displaying a gas station located on a travel route from the current location of the vehicle to a travel-available location with the amount of fuel of the vehicle.

An aspect of the invention includes a vehicle navigation apparatus including: a controller configured to determine whether an event for notifying about schedule information occurs; and a communication unit configured to receive the schedule information when the event occurs, wherein if there is a schedule for a current date in the schedule information, the controller notifies about the schedule.

An aspect of the invention includes a vehicle navigation apparatus including: a controller configured to receive schedule information via a communication unit when a vehicle starts.

An aspect of the invention includes a vehicle navigation apparatus including: a controller configured to receive schedule information via a communication unit when a door of a vehicle is open.

An aspect of the invention includes a vehicle navigation apparatus including: a controller configured to receive schedule information via a communication unit when a security belt of a vehicle is in use.

An aspect of the invention includes a vehicle navigation apparatus including: a controller configured to receive schedule information via a communication unit when the weight of a user is detected.

An aspect of the invention includes a vehicle navigation apparatus including: a controller configured to read schedule information from a mobile phone via a wireless communication network if an event occurs.

An aspect of the invention includes a vehicle navigation apparatus including: a controller configured to receive schedule information from Web server via a wireless communication network if an event occurs.

An aspect of the invention includes a vehicle navigation apparatus including: a controller configured to detect location information from schedule information and set a place corresponding to the location information as a destination.

An aspect of the invention includes a vehicle navigation apparatus including: a controller configured to display a gas station located at a travel route from a current location of a vehicle to a travel-available location with a current amount of fuel of the vehicle, if the vehicle cannot travel from the current location to its destination with the current amount of fuel.

An aspect of the invention includes a device and method for managing a schedule of one or more events in a navigation device of a vehicle. The method includes: determining by the navigation device that a predetermined vehicle event has occurred; receiving the schedule by the navigation device based upon the step of determining; and issuing an alert by the navigation device that a scheduled event has passed, is occurring or will occur within a predetermined time.

The predetermined vehicle event may be one of a vehicle start; a vehicle door operation; a vehicle seat belt operation; a driver seating detection event; and a vehicle window operation.

The step of receiving the schedule may include: wirelessly receiving the schedule from a remote server; and wirelessly receiving the schedule from a mobile communication terminal.

The step of determining by the navigation device that a predetermined vehicle event has occurred may include one of: wirelessly transmitting a corresponding notification from the navigation device to a remote server; and wirelessly transmitting the corresponding notification from the navigation device to a mobile communication terminal.

The step of receiving the schedule may include: displaying a message asking whether to receive the schedule from one of a mobile communication terminal or a remote server; receiving a user selection of one of the mobile communication terminal or the remote server; and wirelessly transmitting a request to receive the schedule from the selected one of the mobile communication terminal or the remote server.

The method may include: retrieving location information corresponding to the scheduled event; and one of automatically setting the location information as a destination, and setting the location information as the destination in response to a user confirmation.

The step of retrieving location information corresponding to a scheduled event may include retrieving one of a schedule event location name, a schedule event address, and a schedule event location phone number.

The method may include: detecting an amount of fuel in the vehicle; determining if the vehicle can reach the destination without refueling; and, if the vehicle is determined to be unable to reach the destination without refueling, displaying location information of a refueling station.

The step of displaying location information of a refueling station may include: displaying location information about a refueling station within a predetermined distance of a travel route from a current location of the vehicle to the destination location and to which the vehicle can travel with the current amount of fuel.

The method may include setting the selected gas station as an intermediate destination automatically or in response to a user selection.

The foregoing and other objects, features, aspects and advantages of the present invention will become more apparent from the following detailed description of the present invention when taken in conjunction with the accompanying drawings.

DETAILED DESCRIPTION OF THE INVENTION

An aspect of the invention includes a vehicle navigation method and apparatus for notifying a user about a schedule. Exemplary embodiments of the present invention are described below with reference to FIGS. 2 to 15.

Figure 1:
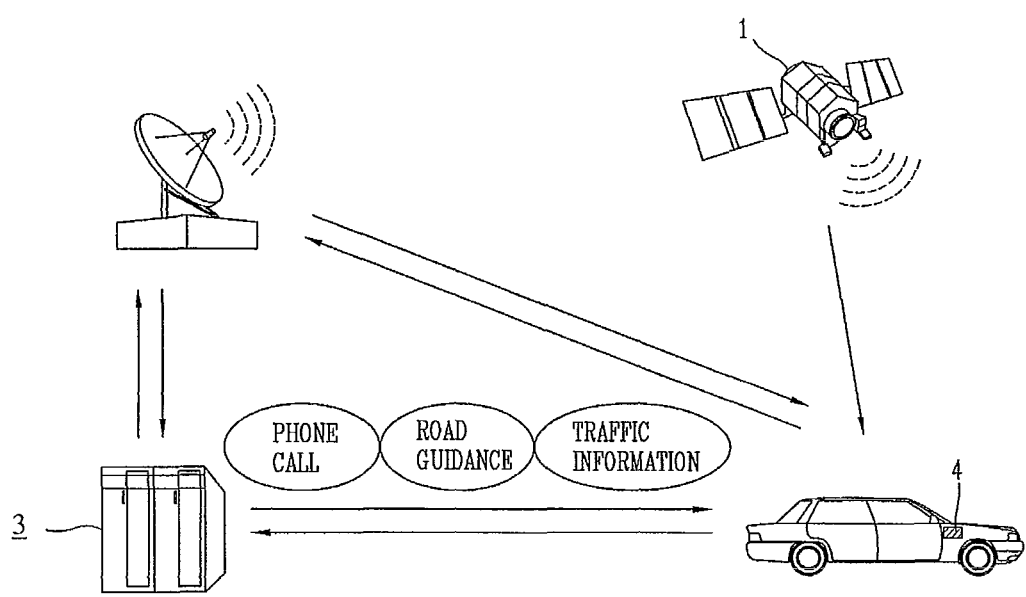
FIG. 1 is a schematic block diagram showing a vehicle navigation system according to the related art.
Figure 2:
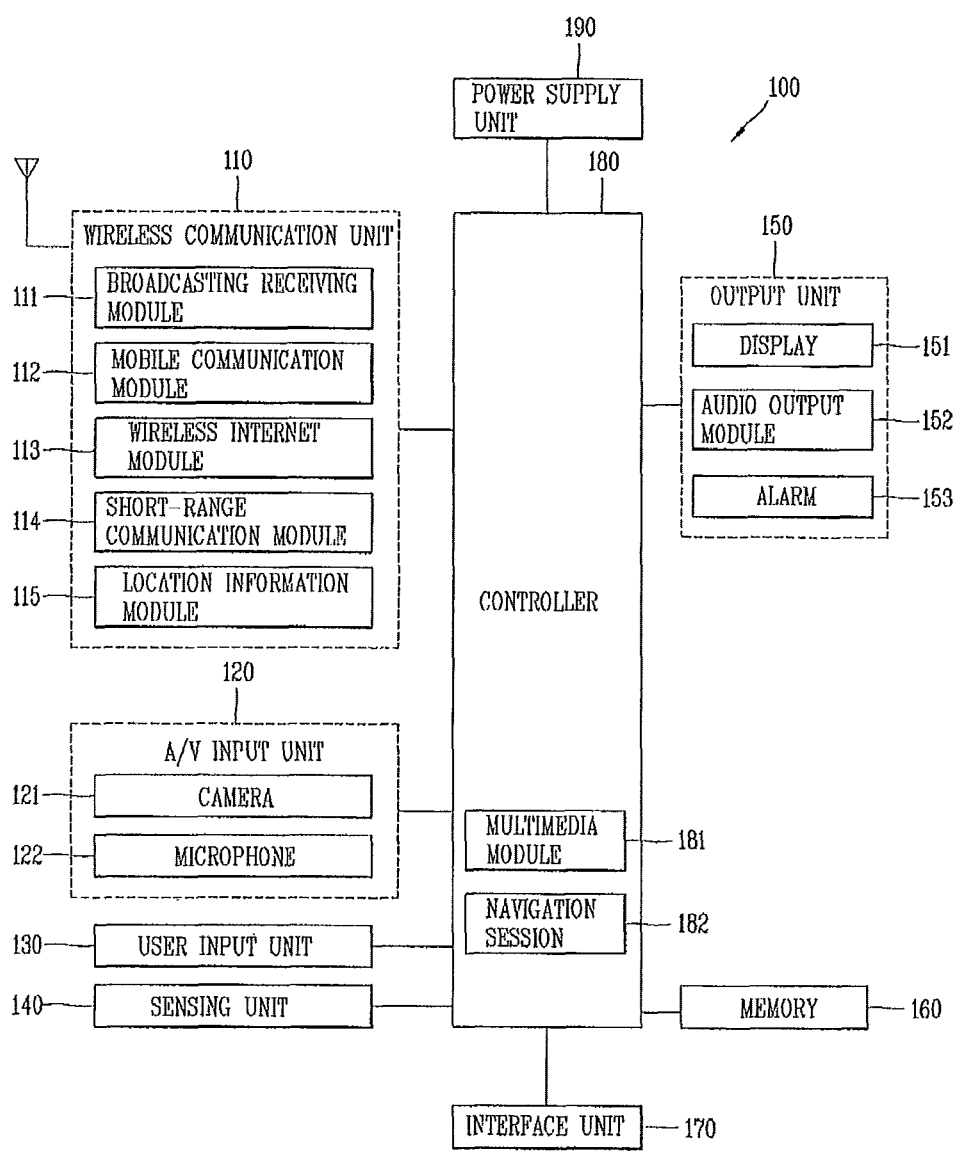
FIG. 2 is a schematic block diagram showing a mobile terminal employing a vehicle navigation apparatus according to an embodiment of the present invention.

FIG. 2 is a schematic block diagram showing a mobile terminal 100 employing a vehicle navigation apparatus according to an embodiment of the present invention. The mobile terminal 100 may be implemented in various forms. For example, the mobile terminal 100 may include mobile phones, smart phones, notebook computers, digital broadcast receivers, PDAs (Personal Digital Assistants), PMPs (Portable Multimedia Player), navigation devices, and the like.

As shown in FIG. 2, the mobile terminal 100 may include a wireless communication unit 110, an A/V (Audio/Video) input unit 120, a user input unit 130, a sensing unit 140, an output unit 150, a memory 160, an interface unit 170, a controller 180, and a power supply unit 190, etc. It should be understood that implementing all of the illustrated components of the mobile terminal 100 shown in FIG. 2 is not a requirement. That is, greater or fewer components may alternatively be implemented.

The wireless communication unit 110 typically includes one or more components allowing radio communication between the mobile terminal 100 and a wireless communication system or a network in which the mobile terminal is located. For example, the wireless communication unit may include at least one of a broadcast receiving module 111, a mobile communication module 112, a wireless Internet module 113, a short-range communication module 114, and a location information module 115.

The broadcast receiving module 111 receives broadcast signals and/or broadcast associated information from an external broadcast management server (or other network entity) or from a wireless communication device via a broadcast channel. The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast signal may include a TV broadcast signal, a radio broadcast signal, a data broadcast signal, and the like. Also, the broadcast signal may further include a broadcast signal combined with a TV or radio broadcast signal.

The broadcast associated information may refer to information associated with a broadcast channel, a broadcast program or a broadcast service provider. The broadcast associated information may also be provided via a mobile communication network and, in this case, the broadcast associated information may be received by the mobile communication module 112.

The broadcast signal may exist in various forms. For example, the broadcast signal may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), etc. The broadcast receiving module 111 may be configured to be suitable for every broadcast system that provides a broadcast signal as well as the above-mentioned digital broadcast systems.

Broadcast signals and/or broadcast-associated information received via the broadcast receiving module 111 may be stored in the memory 160 (or anther type of storage medium).

The mobile communication module 112 transmits and/or receives radio signals to and/or from at least one of a base station (e.g., access point, Node B, etc.), an external terminal (e.g., other user devices) and a server (or other network entities). Such radio signals may include a voice call signal, a video cell signal or various types of data according to text and/or multimedia message transmission and/or reception.

The wireless Internet module 113 supports wireless Internet access for the mobile terminal. This module may be internally or externally coupled to the terminal.

The short-range communication module 114 is a module for supporting short range communications. Some examples of short-range communication technology includes Bluetooth™, Radio Frequency IDentification (RFID), Infrared Data Association (IrDA), Ultra-WideBand (UWB), ZigBee™, and the like.

The location information module 115 is a module for checking or acquiring a location (or position) of the mobile terminal. For example, the location information module 115 may be embodied by using a GPS (Global Positioning System) module that receives location information from a plurality of satellites. Here, the location information may include coordinate information represented by latitude and longitude values. For example, the GPS module may measure an accurate time and distance from three or more satellites, and accurately calculate a current location of the mobile terminal according to trigonometry based on the measured time and distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites. As the location information module 115, a Wi-Fi positioning system and/or hybrid positioning system may be applied.

The A/V input unit 120 is configured to receive an audio or video signal. The A/V input unit 120 may include a camera 121 (or other image capture device) and a microphone 122 (or other sound pick-up device). The camera 121 processes image data of still pictures or video obtained by an image capture device in a video capturing mode or an image capturing mode. The processed image frames may be displayed on a display unit 151 (or other visual output device).

The image frames processed by the camera 121 may be stored in the memory 160 (or other storage medium) or transmitted via the wireless communication unit 110. Two or more cameras 121 may be provided according to the configuration of the mobile terminal.

The microphone 122 may receive sounds (audible data) via a microphone (or the like) in a phone call mode, a recording mode, a voice recognition mode, and the like, and can process such sounds into audio data. The processed audio (voice) data may be converted for output into a format transmittable to a mobile communication base station (or other network entity) via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 (or other user input device) may generate key input data from commands entered by a user to control various operations of the mobile terminal. The user input unit 130 allows the user to enter various types of information, and may include a keypad, a dome switch, a touch pad (e.g., a touch sensitive member that detects changes in resistance, pressure, capacitance, etc. due to being contacted) a jog wheel, a jog switch, and the like. In particular, when the touch pad is overlaid on the display unit 151 in a layered manner, it may form a touch screen.

The sensing unit 140 (or other detection means) detects a current status (or state) of the mobile terminal 100 such as an opened or closed state of the mobile terminal 100, a location of the mobile terminal 100, the presence or absence of user contact with the mobile terminal 100 (i.e., touch inputs), the orientation of the mobile terminal 100, an acceleration or deceleration movement and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device.

The interface unit 170 (or other connection means) serves as an interface by which at least one external device may be connected with the mobile terminal 100. For example, the external devices may include wired or wireless headset ports, an external power supply (or battery charger) ports, wired or wireless data ports, memory card ports, ports for connecting a device having an identification module, audio input/output (I/O) ports, video I/O ports, earphone ports, or the like.

The identification module may be a memory chip (or other element with memory or storage capabilities) that stores various information for authenticating user's authority for using the mobile terminal 100 and may include a user identity module (UIM), a subscriber identity module (SIM) a universal subscriber identity module (USIM), and the like. In addition, the device having the identification module (referred to as the 'identifying device', hereinafter) may take the form of a smart card. Accordingly, the identifying device may be connected with the terminal 100 via a port or other connection means.

The interface unit 170 may be used to receive inputs (e.g., data, information, power, etc.) from an external device and transfer the received inputs to one or more elements within the mobile terminal 100 or may be used to transfer data between the mobile terminal and an external device.

The output unit 150 is configured to provide outputs in a visual, audible, and/or tactile manner (e.g., audio signal, video signal, alarm signal, vibration signal, etc.). The output unit 150 may include the display unit 151, an audio output module 152, an alarm unit 153, and the like.

The display unit 151 may display information processed in the mobile terminal 100. For example, when the mobile terminal 100 is in a phone call mode, the display unit 151 may display a User Interface (UI) or a Graphic User Interface (GUI) associated with a call or other communication (such as text messaging, multimedia file downloading, etc.). When the mobile terminal 100 is in a video call mode or image capturing mode, the display unit 151 may display a captured image and/or received image, a UI or GUI that shows videos or images and functions related thereto, and the like.

Meanwhile, when the display unit 151 and the touch pad are overlaid in a layered manner to form a touch screen, the display unit 151 may function as both an input device and an output device. The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, or the like. The mobile terminal 100 may include two or more display units (or other display means) according to its particular desired embodiment. For example, the mobile terminal may include both an external display unit (not shown) and an internal display unit (not shown).

The audio output module 152 may convert and output as sound audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function performed by the mobile terminal 100 (e.g., a call signal reception sound, a message reception sound, etc.). The audio output module 152 may include a speaker, a buzzer, or other sound generating device.

The alarm unit 153 (or other type of user notification means) may provide outputs to inform about the occurrence of an event of the mobile terminal 100. Typical events may include call reception, message reception, key signal inputs, etc. In addition to audio or video outputs, the alarm unit 153 may provide outputs in a different manner to inform about the occurrence of an event. For example, the alarm unit 153 may provide an output in the form of vibrations (or other tactile or sensible outputs). When a call, a message, or some other incoming communication is received, the alarm unit 153 may provide tactile outputs (i.e., vibrations) to inform the user. Thereof. By providing such tactile outputs, the user can recognize the occurrence of various events even if his mobile phone 100 is in the user's pocket. Outputs informing about the occurrence of an event may be also provided via the display unit 151 or the audio output module 152.

The memory 160 (or other storage means) may store software programs or the like used for the processing and controlling operations performed by the controller 180, or may temporarily store data (e.g., a phonebook, messages, still images, video, etc.) that have been outputted or which are to be outputted.

The memory 160 may include at least one type of storage medium including a Flash memory, a hard disk, a multimedia card, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disk, an optical disk, and the like. Also, the mobile terminal 100 may cooperate with a network storage device that performs the storage function of the memory 160 over a network connection.

The controller 180 (such as a microprocessor or the like) typically controls the general operations of the mobile terminal. For example, the controller 180 performs controlling and processing associated with voice calls, data communications, video calls, and the like. In addition, the controller 180 may include a multimedia module 181 for reproducing (or playing back) multimedia data. The multimedia module 181 may be configured within the controller 180 or may be configured to be separate from the controller 180. The controller 180 may include a navigation session 182 for controlling navigation sessions, as described below.

The power supply unit 190 receives external power (via a power cable connection) or internal power (via a battery of the mobile terminal) and supplies appropriate power required for operating respective elements and components under the control of the controller 180.

Various functions applied to the mobile terminal 100 may be implemented in a computer-readable medium using, for example, computer software, hardware, or any combination thereof.

For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented in the controller 180.

For software implementation, the embodiments such as procedures or functions may be implemented together with separate software modules that allow performing of at least one function or operation. Software codes can be implemented by a software application (or program) written in any suitable programming language. The software codes may be stored in the memory 160 and executed by the controller 180.

When an event for notifying about a schedule and/or scheduled event occurs and there is a schedule and/or scheduled event for a current date, a navigation session 182 applied to the mobile terminal 100 according to the present invention informs a user about the schedule and/or scheduled event. For example, on the assumption that the mobile terminal 100 is physically or wirelessly connected to a vehicle control module (not shown) of a vehicle, the navigation session 182 of the mobile terminal 100 receives a signal generated, when the user gets into the vehicle, from the vehicle control module and determines whether or not there is a schedule and/or scheduled event for the current date from the schedule information based on the received signal. If there is a schedule and/or scheduled event for the current date, the navigation session 182 informs the user about the schedule and/or scheduled event.

The configuration of a telematics terminal 200 employing the vehicle navigation apparatus according to an embodiment of the present invention will now be described with reference to FIG. 3.

Figure 3:
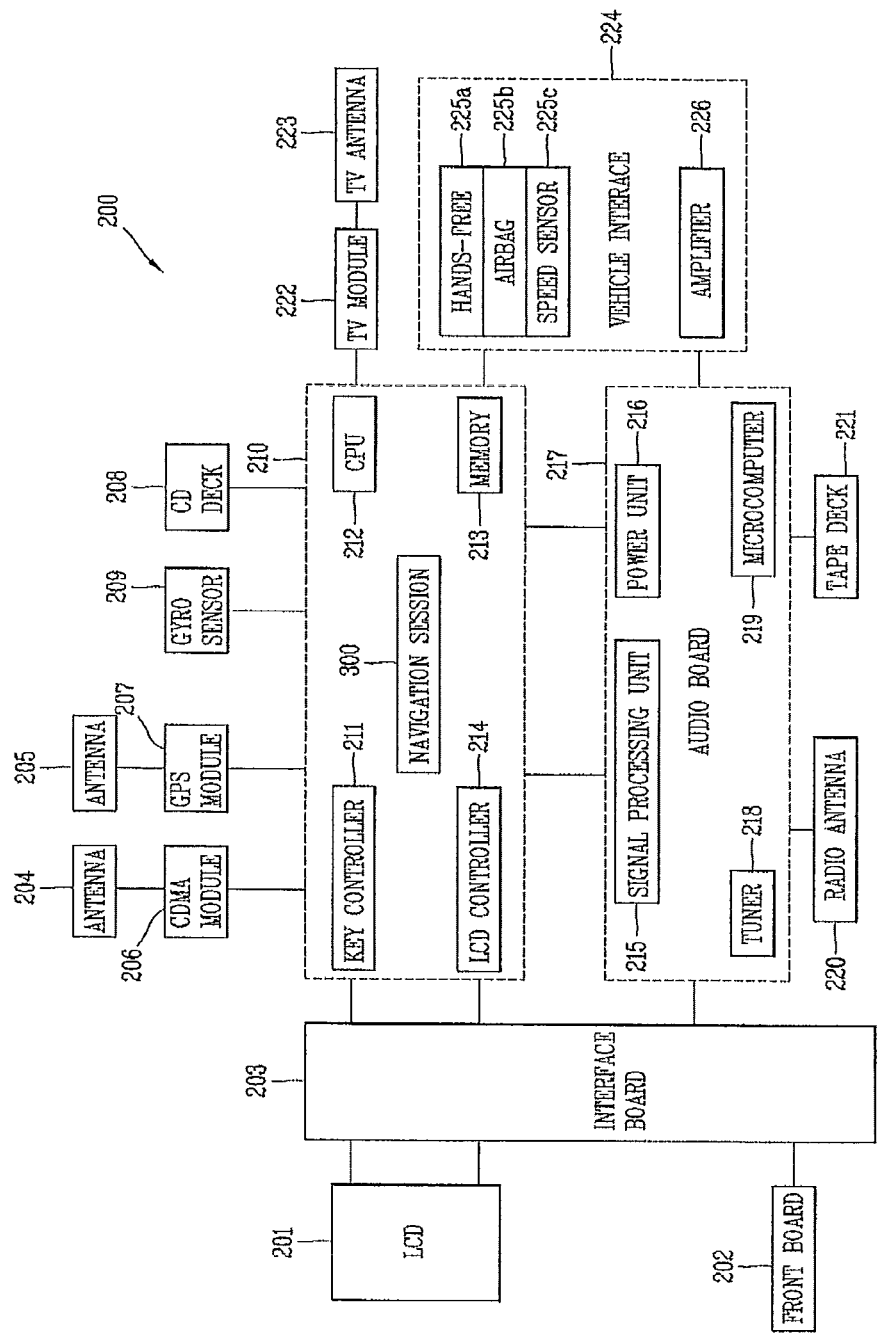
FIG. 3 is a schematic block diagram showing a telematics terminal employing the vehicle navigation apparatus according to the present invention.

FIG. 3 is a schematic block diagram showing the telematics terminal 200 employing the vehicle navigation apparatus 300 according to the present invention.

As shown in FIG. 3, the telematics terminal 200 employing the navigation device 300 according to the embodiment of the present invention includes a main board 210 including a CPU (Central Processing Unit) 212 for controlling the telematics terminal 200 overall, a memory 213 for storing various information, a key controller 211 for controlling various key signals, and an LCD controller 214 for controlling an LCD.

The memory 213 stores map information (map data) for displaying road guidance information on a digital map. Also, the memory 213 stores a traffic information collecting control algorithm for inputting traffic information according to the situation of a road along which the vehicle currently travels (runs), and information for controlling the algorithm.

The main board 210 includes a CDMA module 206, a mobile terminal having a unique device number as assigned and installed in the vehicle, a GPS module 207 for guiding a location of the vehicle, receiving a GPS signal for tracking a travel route from a start point to a destination, or transmitting traffic information collected by the user as a GPS signal, a CD deck 208 for reproducing a signal recorded in a CD (Compact Disk), a gyro sensor 209, or the like. The CDMA module 206 and the GPS module 207 receive signals via antennas 204 and 205.

A TV module 222 is connected with the main board 210 and receives a TV signal via a TV antenna 223. An LCD 201 under the control of the LCD controller 214 and a front board 202 under the control of the key controller 211 are connected to the main board 210 via an interface board 203. The LCD 201 displays various video signals and character signals, and the front board 202 includes buttons for various key signal inputs and provides a key signal corresponding to a button selected by the user to the main board 210. The front board 202 includes a menu key for directly inputting traffic information. The menu key may be configured to be controlled by the key controller 211.

An audio board 217 is connected with the main board 210 and processes various audio signals. The audio board 217 includes a microcomputer 219 for controlling the audio board 217, a tuner 218 for receiving a radio signal, a power source unit 216 for supplying power to the microcomputer 219 and a signal processing unit 215 for processing various voice signals.

The audio board 217 also includes a radio antenna 220 for receiving a radio signal and a tape deck 221 for reproduce an audio tape. The audio board 217 may further include an amplifier 226 for outputting a voice signal processed by the audio board 217.

The amplifier 226 is connected to a vehicle interface 224. Namely, the audio board 217 and the main board 210 are connected to the vehicle interface 224. A handsfree 225a for inputting a voice signal, an airbag 225b configured for the security of a passenger, a speed sensor 225c for detecting the speed of the vehicle, or the like, may be connected to the vehicle interface 224. The speed sensor 225c calculates a vehicle speed and provides the calculated vehicle speed information to the CPU 212.

According to the embodiments of the present invention, when an event for informing about a schedule occurs and there is a scheduled even for a current date, the navigation session 300 applied to the telematics terminal 200 informs the user about the schedule and/or scheduled event. For example, if it is assumed that the telematics terminal 200 is connected to a vehicle control module (not shown) of a vehicle, the navigation session 300 of the telematics terminal 200 receives a signal generated when the user gets into the vehicle from the vehicle control module and determines whether or not there is a schedule and/or scheduled event for the current date from the schedule information based on the received signal. If there is a schedule and/or scheduled event for the current date, the navigation session 300 informs the user about the schedule. Here, the function of the navigation session according to the embodiments of the present invention may be performed by the CPU (controller) 212 of the telematics terminal 200.

The vehicle navigation apparatus according to various embodiments of the present invention as applied to the telematics terminal 200 will now be described with reference to FIGS. 4 to 15. Here, the vehicle navigation apparatus according to various embodiments of the present invention may be applied to the mobile terminal 100 as well as to the telematics terminal 200. The vehicle navigation apparatus according to the embodiments of the present invention can be configured as an independent apparatus.

Figure 4:
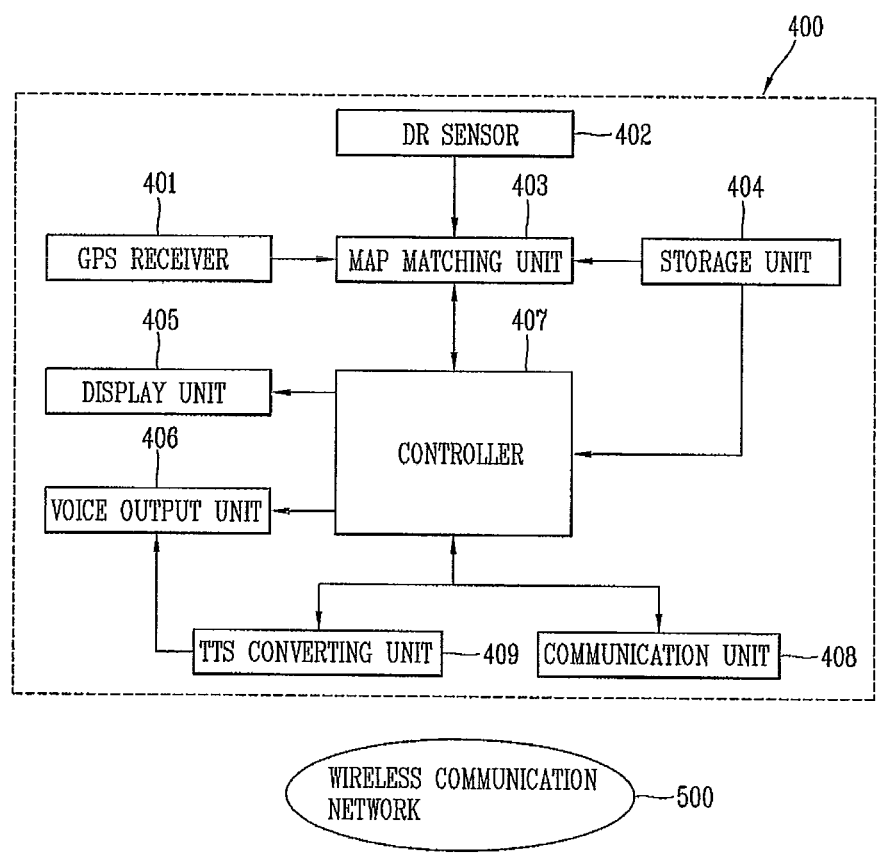
FIG. 4 is a schematic block diagram showing the configuration of a vehicle navigation apparatus according to a first embodiment of the present invention.

FIG. 4 is a schematic block diagram showing the configuration of the vehicle navigation apparatus according to a first embodiment of the present invention.

As shown in FIG. 4, the navigation apparatus 400 according to the first embodiment of the present invention includes a GPS receiver 401 for receiving a GPS signal from a satellite and generating first vehicle location data of the navigation apparatus (regarded as the same location as the telematics terminal 200 or the mobile terminal 100) based on the received GPS signal; a DR (Dead-Reckoning) sensor 402 for generating second vehicle location data based on a travel direction and the speed of a vehicle; a storage unit 404 for storing map data; a map matching unit 403 for generating a vehicle estimated location based on the first and second vehicle location data, matching the generated vehicle estimated location and a line (map matching link or a map matching road) in map data stored in the storage unit 404, and outputting the matched map information (map matching results); a communication unit 408 for receiving real time traffic information from an information providing center via a wireless communication network 400 and receiving schedule information from the mobile terminal or a server (e.g., a Web server); a controller 407 for determining whether there is a schedule and/or scheduled event for a current date in the schedule information if the event for notifying about the schedule information occurs, and notifying about the schedule and/or scheduled event if the scheduled event is due for the current date; a display unit 405 for displaying a road guidance map included in the road guidance information and displaying a schedule; and a TTX (Text To Speech) conversion unit 409 for converting the schedule (text information) into a sound (voice); and a voice output unit 406 for outputting road guidance voice information (road guidance voice message) included in the road guidance information or outputting the voice-converted schedule and/or scheduled event.

When an event for notifying about schedule information occurs, the vehicle navigation apparatus 400 according to the first embodiment of the present invention receives the schedule information from the mobile terminal via a wireless communication network and determines whether or not there is a schedule and/or scheduled event for a current date from the received schedule information. If there is a schedule and/or scheduled event for the current date, the vehicle navigation apparatus informs the user about the schedule.

Thus, when the user gets into the vehicle (i.e., when the event for notifying about the schedule information occurs) and if there is a schedule for the current date, the schedule and/or a scheduled event and related information is notified to the user.

Here, the GPS receiver 401 may include the GPS module 407 of the telematics terminal, the storage unit 404 may be the memory 213 of the telematics terminal, the display unit 405 may be the LCD 201 of the telematics terminal, and the voice output unit 406 may be the amplifier 226 of the telematics terminal. In addition, the functions of the map matching unit 403 and the controller 407 may be performed by the navigation session 300 of the CPU 212.

The technique of generating the vehicle estimated location based on the first vehicle location data generated by the GPS receiver 401 and the second vehicle location data generated by the DR sensor 402 is a known art, so its detailed description will be omitted.

The configuration of the vehicle navigation apparatus according to the embodiments of the present invention will now be described in detail with reference to FIG. 4.

First, when a road guidance mode is selected, the GPS receiver 401 receives a GPS signal from a satellite, generates first vehicle location data in real time based on the longitude and latitude coordinates included in the received GPS signal, and outputs the first vehicle location data to the map matching unit 403. Here, the vehicle location information can be also received through Wi-Fi or WiBro communication as well as through the GPS receiver 401.

The DR sensor 402 generates the second vehicle location data based on the travel direction (running direction) and the speed of the vehicle, and outputs the second vehicle location data to the map matching unit 403.

The map matching unit 403 generates a vehicle estimated location based on the first and second vehicle location data, and reads map data corresponding to a travel route from the storage unit 404.

The map matching unit 403 matches the vehicle estimated location and a link (road) included in the map data, and outputs the matched map information (map matching results) to the controller 407. For example, the map matching unit 403 generates the vehicle estimated location based on the first and second location data, matches the generated vehicle estimated location and links in the map data stored in the storage unit 404 according to the link order, ad outputs the matched map information (map matching results) to the controller 407.

The controller 407 generates road guidance information based on the matched map information, and outputs the generated road guidance information to the display unit 405 and the voice output unit 406. Here, the display unit 405 displays the road guidance information.

Meanwhile, when an event for notifying about the schedule information occurs, the controller 407 receives the schedule information from the mobile terminal (e.g., mobile phone 100) via the wireless communication network, determines whether there is a schedule for the current date from the received schedule information, and notifies the user about the schedule if any.

The vehicle navigation method according to the first embodiment of the present invention will now be described in detail with reference to FIGS. 4 and 5.

Figure 5:
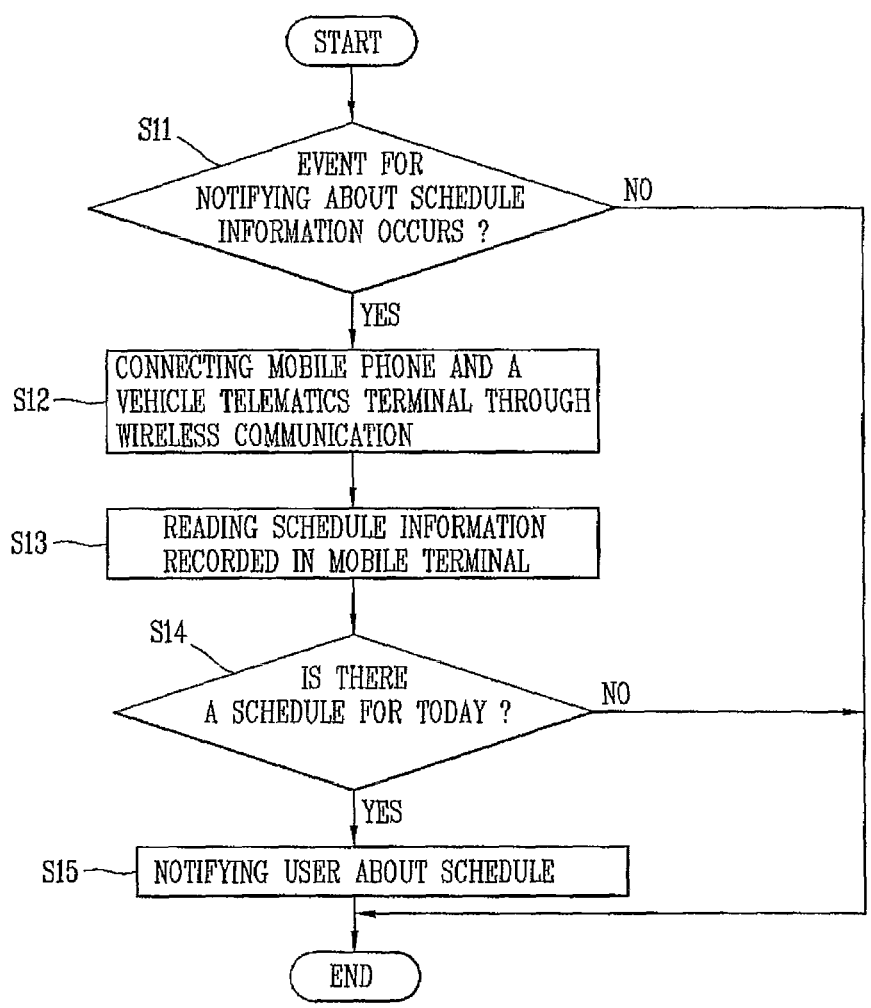
FIG. 5 is a flow chart illustrating the process of a vehicle navigation method according to the first embodiment of the present invention.

FIG. 5 is a flow chart illustrating the process of a vehicle navigation method according to the first embodiment of the present invention.

First, the controller 407 determines whether or not an event for notifying about schedule information occurs (S11). Here, the controller may determine whether or not an event for notifying about schedule information occurs through various events. For example, when the user gets into the vehicle, the controller 407 may notify the user about the schedule information. Other events may be a vehicle start; a vehicle door operation; a vehicle seat belt operation; a driver seating detection event; and a vehicle window operation. One skilled in the art will recognize that other events may also be considered an event for notifying a user about the schedule information.

When the event for notifying about the schedule information occurs, the controller 407 connects the communication unit 408 and the mobile phone 100 via the wireless communication network (e.g., Bluetooth) (S12). For example, when the driver gets into the vehicle, generally, he carries his mobile phone 100 along, so the controller 407 connects the communication unit 408 and the mobile phone 100 via the Bluetooth communication network when the driver gets into the vehicle. Alternatively, the mobile phone 100 may already be in the vehicle, and may be manually or automatically connected to the communication unit 408 when the vehicle is powered, when the vehicle is started or when mobile phone 100 is powered. When the communication unit 408 and the mobile phone 100 are connected, the controller 407 receives (reads) schedule information from the mobile phone 100 via the communication unit 408 (S13).

The controller 407 determines whether or not there is a schedule and/or scheduled event for a current date (today) in the received schedule information (S14).

A version of the schedule may be pre-stored in vehicle navigation apparatus 400. Thus, controller 407 may also determine whether or not there is a schedule and/or scheduled event for a current date (today) in the pre-stored schedule. In this case, steps S12 and S13 are not performed.

In step S13, the controller 407 can also compare version information of the pre-stored schedule with version information of the schedule in the mobile phone 100. If the version of the schedule in the mobile phone 100 is newer than the version of the pre-stored schedule, the controller 407 can either automatically download the newer version, or can display a visual or audio prompt asking the user to instruct the controller 407 to download the newer version of the schedule.

If there is a schedule and/or scheduled event matched to the current date (today) in the received schedule information, the controller 407 outputs the schedule and/or scheduled event to the display unit 405 and/or the TTS (Text-To-Speech) conversion unit 409.

The display unit 405 displays the schedule and/or scheduled event on the screen. The TTS conversion unit 409 converts characters correspond to the schedule and/or scheduled event into a sound and outputs the converted sound via the voice output unit 406 (S15). Namely, the controller 407 notifies the user about the schedule and/or scheduled event matched to the current date via the display unit 405 and/or the voice output unit 406.

A vehicle navigation method according to the second embodiment of the present invention will now be described in detail with reference to FIGS. 4 and 6.

Figure 6:
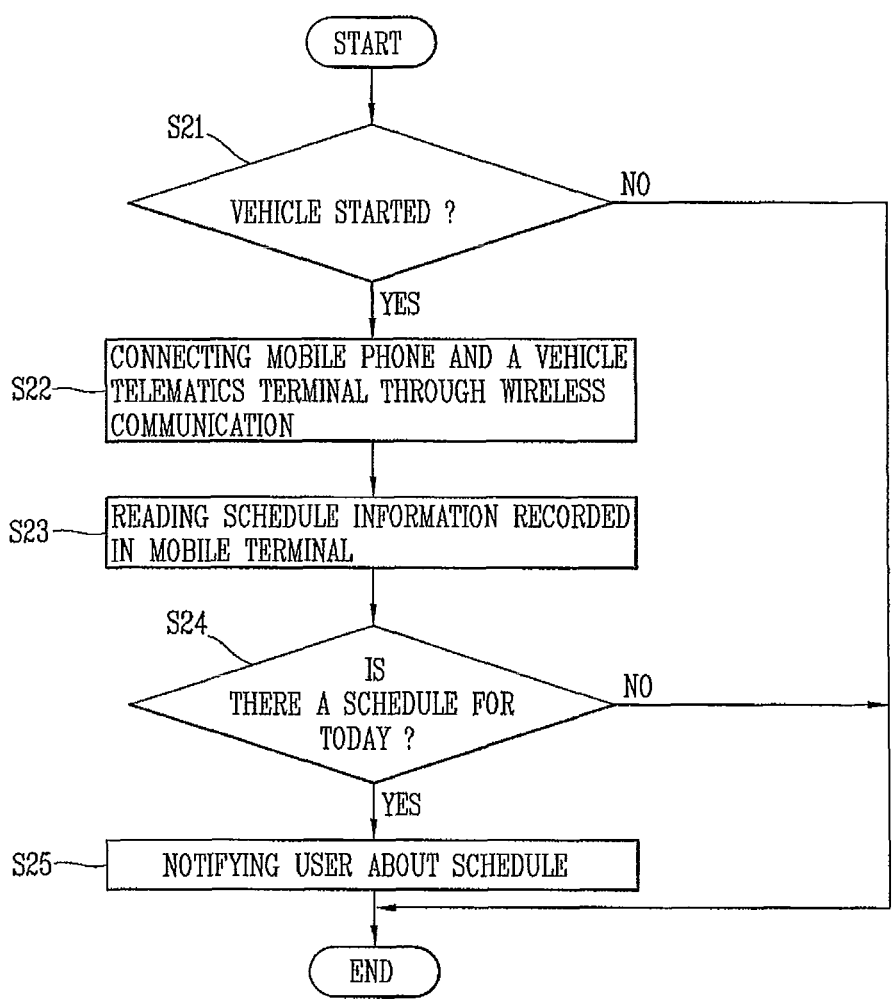
FIG. 6 is a flow chart illustrating the process of a vehicle navigation method according to a second embodiment of the present invention.

FIG. 6 is a flow chart illustrating the process of a vehicle navigation method according to the second embodiment of the present invention.

First, the controller 407 determines whether or not a signal generated when the vehicle starts is received from the vehicle control module (S21). Here, the vehicle control module is a general control device mounted in the vehicle to control the engine, a security belt, seats, doors, or the like, of the vehicle. In addition, the vehicle control module is electrically connected with the telematics terminal 200.

When a signal generated when the vehicle starts is received from the vehicle control module, the controller 407 connects the communication unit 408 and the mobile phone 100 via the wireless communication network (e.g., Bluetooth) (S22). For example, when the vehicle starts, the controller 407 assumes that the driver has gotten into the vehicle, and connects the communication unit 408 and the mobile phone 100 via the Bluetooth communication network.

When the communication unit 408 and the mobile phone 100 are connected, the controller 407 receives (reads) the schedule information from the mobile phone 100 via the communication unit 408 (S23).

The controller 407 determines whether or not there is a schedule and/or scheduled event for a current date (today) in the received schedule information (S24). For example, the controller 407 detects a schedule and/or scheduled event matched to the current date from the schedule information.

If there is a schedule and/or scheduled event matched to the current date (today) in the received schedule information, the controller 407 notifies the user about the schedule and/or scheduled event (S25).

A version of the schedule may be pre-stored in vehicle navigation apparatus 400. Thus, controller 407 may also determine whether or not there is a schedule and/or scheduled event for a current date (today) in the pre-stored schedule. In this case, steps S22 and S23 are not performed.

In step S23, the controller 407 can also compare version information of the pre-stored schedule with version information of the schedule in the mobile phone 100. If the version of the schedule in the mobile phone 100 is newer than the version of the pre-stored schedule, the controller 407 can either automatically download the newer version, or can display a visual or audio prompt asking the user to instruct the controller 407 to download the newer version of the schedule.

A vehicle navigation method according to a third embodiment of the present invention will now be described in detail with reference to FIGS. 4 and 7.

Figure 7:
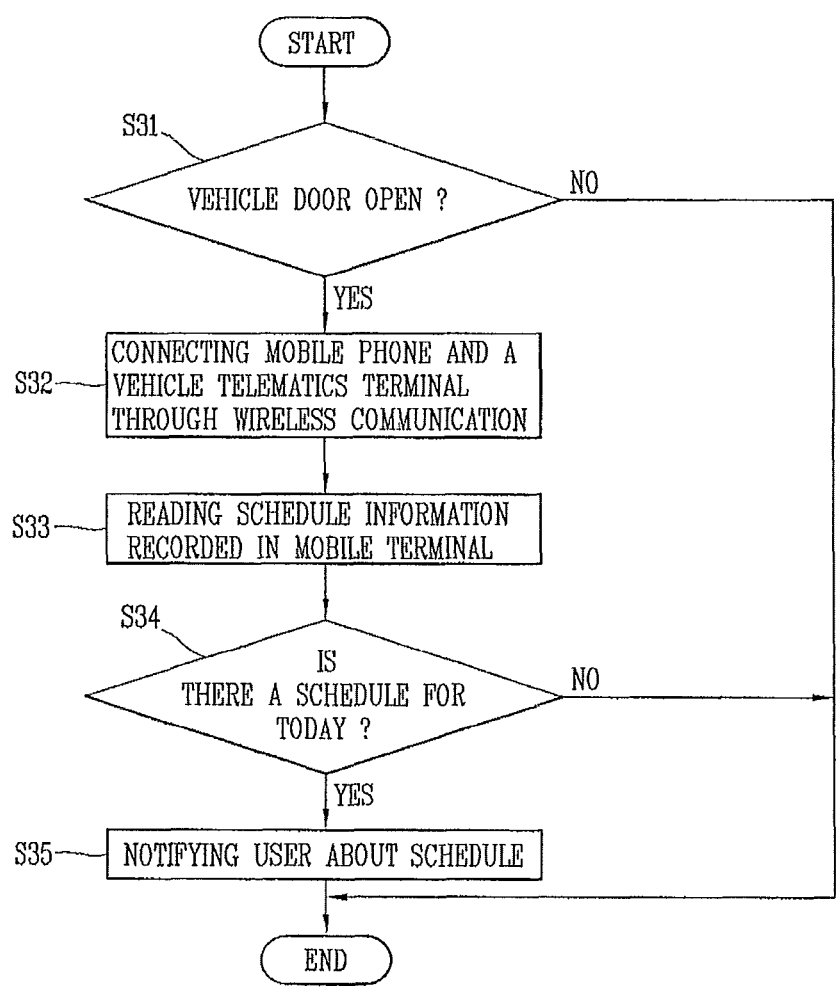
FIG. 7 is a flow chart illustrating the process of a vehicle navigation method according to a third embodiment of the present invention.

FIG. 7 is a flow chart illustrating the process of a vehicle navigation method according to the third embodiment of the present invention.

First, the controller 407 determines whether or not a signal generated when the door of the vehicle is open is received from the vehicle control module (S31). Here, the controller 407 may directly receive a control signal for remotely turning on and opening the door of the vehicle via the communication unit 408. Here, the communication unit 408 may include both a short-range wireless communication unit (e.g., a Bluetooth module) and a remote wireless communication unit (e.g., a WiBro module or a CDMA module).

When a signal generated when the door of the vehicle is open is received, the controller 407 connects the communication unit 408 and the mobile phone 100 via the wireless communication network (e.g., Bluetooth) (S32). For example, when the door of the vehicle is open, the controller 407 regards that the driver gets into the vehicle, and connects the communication unit 408 and the mobile phone 100 via the short-range wireless communication network (e.g., the Bluetooth communication network).

When the communication unit 408 and the mobile phone 100 are connected, the controller 407 receives (reads) the schedule information from the mobile phone 100 via the communication unit 408 (S33).

The controller 407 determines whether or not there is a schedule and/or scheduled event for a current date (today) in the received schedule information (S34). For example, the controller 407 detects a schedule and/or scheduled event matched to the current date from the schedule information.

If there is a schedule and/or scheduled event matched to the current date (today) in the received schedule information, the controller 407 notifies the user about the schedule and/or scheduled event (S35).

A version of the schedule may be pre-stored in vehicle navigation apparatus 400. Thus, controller 407 may also determine whether or not there is a schedule and/or scheduled event for a current date (today) in the pre-stored schedule. In this case, steps S32 and S33 are not performed.

In step S33, the controller 407 can also compare version information of the pre-stored schedule with version information of the schedule in the mobile phone 100. If the version of the schedule in the mobile phone 100 is newer than the version of the pre-stored schedule, the controller 407 can either automatically download the newer version, or can display a visual or audio prompt asking the user to instruct the controller 407 to download the newer version of the schedule.

A vehicle navigation method according to a fourth embodiment of the present invention will now be described in detail with reference to FIGS. 4 and 8.

Figure 8:
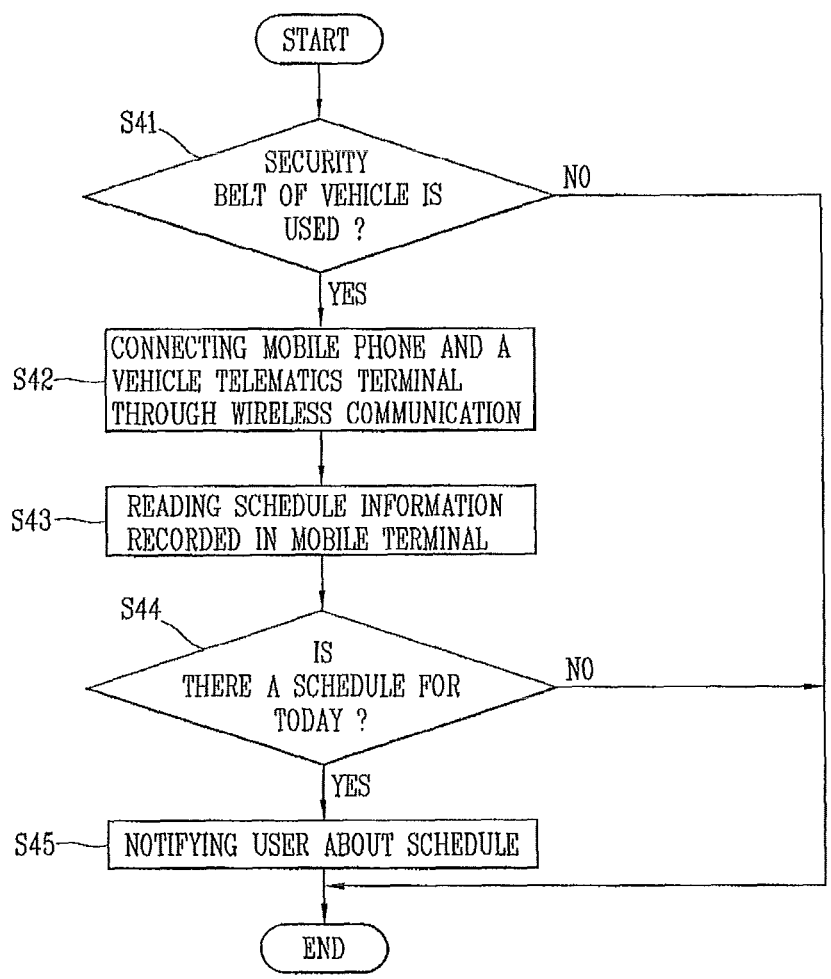
FIG. 8 is a flow chart illustrating the process of a vehicle navigation method according to a fourth embodiment of the present invention.

FIG. 8 is a flow chart illustrating the process of a vehicle navigation method according to the fourth embodiment of the present invention.

First, the controller determines whether or not a signal generated when the security belt of the vehicle is used is received from the vehicle control module (S41). Here, when the security belt is used by the driver, the vehicle control module generates a signal for notifying about the corresponding fact, and displays the generated signal on a dashboard of the vehicle or transmits it to the controller 407 via the communication unit 408.

When a signal generated when the security belt of the vehicle is used is received, the controller 407 connects the communication unit 408 and the mobile phone 100 via the wireless communication network (e.g., Bluetooth) (S42). For example, when the security belt of the vehicle is used by the driver, the controller 407 regards that the driver gets into the vehicle, and connects the communication unit 408 and the mobile phone 100 via the Bluetooth communication network.

When the communication unit 408 and the mobile phone 100 are connected, the controller 407 receives (reads) the schedule information from the mobile phone 100 via the communication unit 408 (S43).

The controller 407 determines whether or not there is a schedule and/or scheduled event for a current date (today) in the received schedule information (S44). For example, the controller 407 detects a schedule and/or scheduled event matched to the current date from the schedule information.

If there is a schedule and/or scheduled event matched to the current date (today) in the received schedule information, the controller 407 notifies the user about the schedule and/or scheduled event (S45).

A version of the schedule may be pre-stored in vehicle navigation apparatus 400. Thus, controller 407 may also determine whether or not there is a schedule and/or scheduled event for a current date (today) in the pre-stored schedule. In this case, steps S42 and S43 are not performed.

In step S43, the controller 407 can also compare version information of the pre-stored schedule with version information of the schedule in the mobile phone 100. If the version of the schedule in the mobile phone 100 is newer than the version of the pre-stored schedule, the controller 407 can either automatically download the newer version, or can display a visual or audio prompt asking the user to instruct the controller 407 to download the newer version of the schedule.

A vehicle navigation method according to a fifth embodiment of the present invention will now be described in detail with reference to FIGS. 4 and 9.

Figure 9:
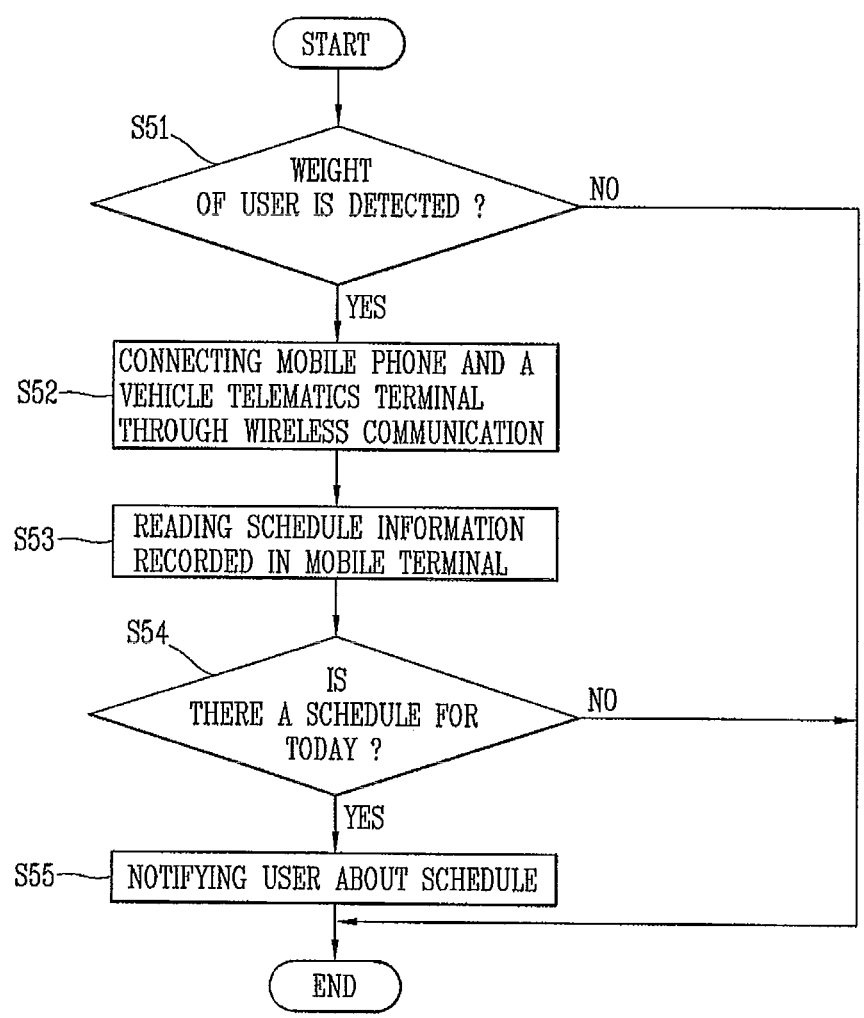
FIG. 9 is a flow chart illustrating the process of a vehicle navigation method according to a fifth embodiment of the present invention.

FIG. 9 is a flow chart illustrating the process of a vehicle navigation method according to the fifth embodiment of the present invention.

First, the controller determines whether or not a signal generated when the weight of the user is detected by a weight detecting unit (not shown) mounted at the driver's seat is received from the vehicle control module (S51). Here, the weight detecting unit may be installed at the driver's seat, detect the weight of the user (driver) and output the detected signal to the controller 407 via the vehicle control module or the communication unit 408.

When the signal generated when the weight of the user is detected is received, the controller 407 connects the communication unit 408 and the mobile phone 100 via the wireless communication network (e.g., Bluetooth) (S52). For example, when the weight of the user is detected, the controller 407 regards that the driver gets into the vehicle, and connects the communication unit 408 and the mobile phone 100 via the Bluetooth communication network.

When the communication unit 408 and the mobile phone 100 are connected, the controller 407 receives (reads) the schedule information from the mobile phone 100 via the communication unit 408 (S53).

The controller 407 determines whether or not there is a schedule and/or scheduled event for a current date (today) in the received schedule information (S54). For example, the controller 407 detects a schedule and/or scheduled event matched to the current date from the schedule information.

If there is a schedule and/or scheduled event matched to the current date (today) in the received schedule information, the controller 407 notifies the user about the schedule (S55).

A version of the schedule may be pre-stored in vehicle navigation apparatus 400. Thus, controller 407 may also determine whether or not there is a schedule and/or scheduled event for a current date (today) in the pre-stored schedule. In this case, steps S52 and S53 are not performed.

In step S53, the controller 407 can also compare version information of the pre-stored schedule with version information of the schedule in the mobile phone 100. If the version of the schedule in the mobile phone 100 is newer than the version of the pre-stored schedule, the controller 407 can either automatically download the newer version, or can display a visual or audio prompt asking the user to instruct the controller 407 to download the newer version of the schedule.

A vehicle navigation apparatus according to a sixth embodiment of the present invention will now be described in detail with reference to FIGS. 10 and 11.

Figure 10:
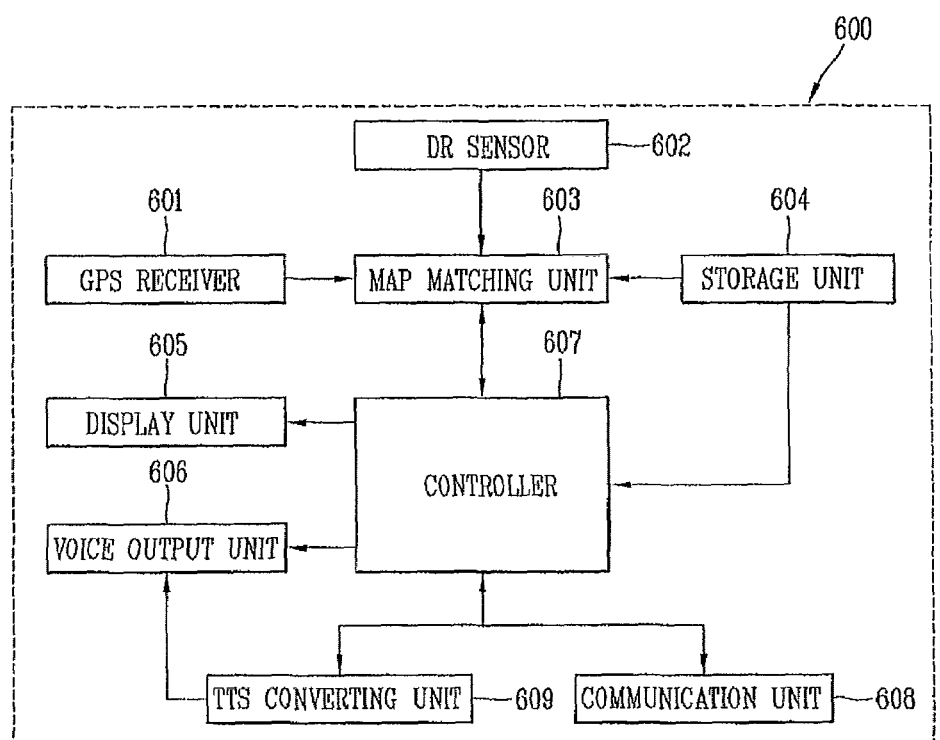
FIG. 10 is a schematic block diagram showing the configuration of a vehicle navigation apparatus according to a sixth embodiment of the present invention.

FIG. 10 is a schematic block diagram showing the configuration of the vehicle navigation apparatus according to the sixth embodiment of the present invention.

As shown in FIG. 10, the vehicle navigation apparatus according to the sixth embodiment of the present invention includes: the navigation apparatus 600 according to the first embodiment of the present invention includes a GPS receiver 601 for receiving a GPS signal from a satellite and generating first vehicle location data of the navigation apparatus (regarded as the same location as the telematics terminal 200 or the mobile terminal 100) based on the received GPS signal; a DR (Dead-Reckoning) sensor 602 for generating second vehicle location data based on a travel direction and the speed of a vehicle; a storage unit 604 for storing map data; a map matching unit 603 for generating a vehicle estimated location based on the first and second vehicle location data, matching the generated vehicle estimated location and a line (map matching link or a map matching road) in map data stored in the storage unit 604, and outputting the matched map information (map matching results), a communication unit 608 for receiving real time traffic information from an information providing center via a wireless communication network 600 and receiving schedule information from a Web server; a controller 607 for determining whether there is a schedule and/or scheduled event for a current date in the schedule information if the event for notifying about the schedule information occurs, and notifying about the schedule and/or scheduled event if the schedule and/or scheduled event is due for the current date; a display unit 605 for displaying a road guidance map included in the road guidance information and displaying a schedule; and a TTX (Text To Speech) conversion unit 609 for converting the schedule (text information) into a sound (voice); and a voice output unit 606 for outputting road guidance voice information (road guidance voice message) included in the road guidance information or outputting the voice-converted schedule and/or scheduled event.

When an event for notifying about schedule information occurs, the vehicle navigation apparatus 600 according to the sixth embodiment of the present invention transmits a notification signal informing about the occurrence of the event to the Web server 800 via a wireless communication network, receives schedule information of the user transmitted from the Web server 800 in response to the notification signal, determines whether or not there is a schedule and/or scheduled event for a current date in the received schedule information, and notifies the user about the schedule and/or scheduled event for the current date if any. Here, the user may store his schedule in the Web server 800 via a personal computer.

Thus, according to the vehicle navigation method and apparatus according to the embodiments of the present invention, when the user gets into the vehicle (i.e., when the event for notifying about the schedule information occurs) and if there is a schedule and/or scheduled event for the current date, the schedule and/or scheduled event is received from the Web server 800 and notified to the user, thereby accurately and effectively notifying the user about the schedule information stored in the Web server 800.

The vehicle navigation apparatus according to the sixth embodiment of the present invention will now be described in detail with reference to FIGS. 10 and 11.

Figure 11:
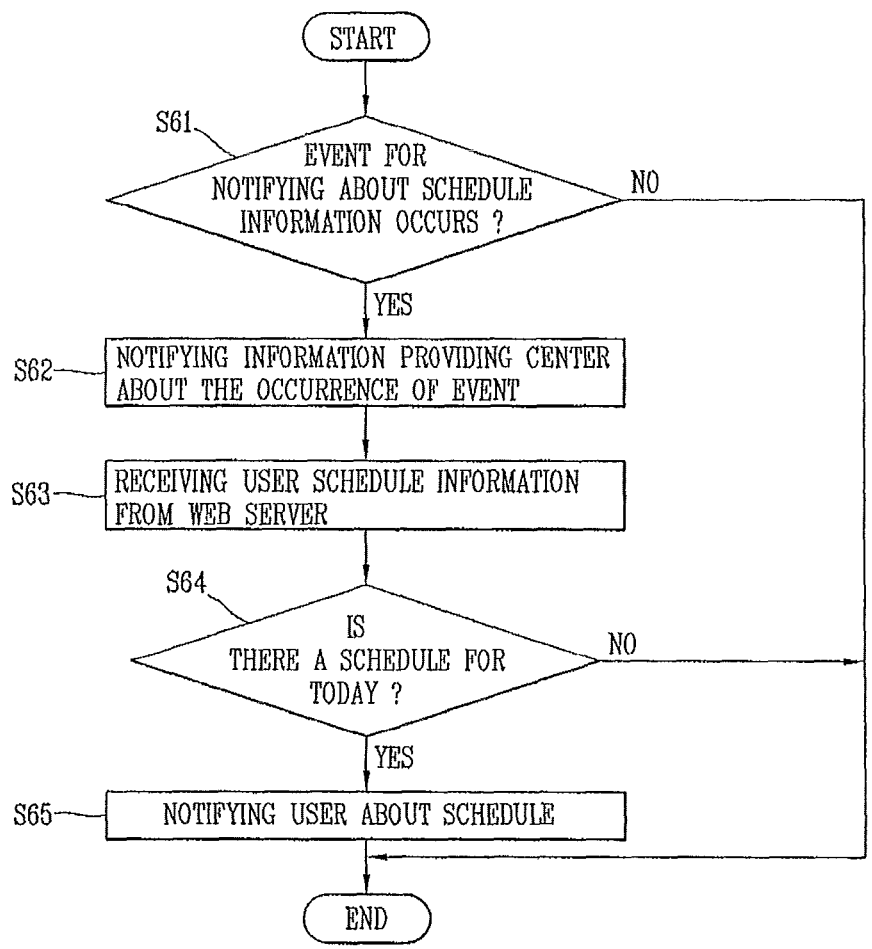
FIG. 11 is a flow chart illustrating the process of a vehicle navigation method according to the sixth embodiment of the present invention.

FIG. 11 is a flow chart illustrating the process of the vehicle navigation method according to the sixth embodiment of the present invention.

First, the controller 607 determines whether or not an event for notifying about schedule information occurs (S61).

When an event for notifying about the schedule information occurs, the controller 407 transmits a notification signal informing about the occurrence of the event to the information providing center 900 via the wireless communication network 700 (S62). Here, when the event for notifying about the schedule information occurs, the controller 407 may directly transmit the notification signal informing about the occurrence of event to the Web server 800 via the wireless communication network 700 or receive the schedule information from the Web server.

The information providing center 900 is connected to the Web server 800 via a fixed line communication network or the wireless communication network 700 based on the notification signal, and receives the schedule information recorded by the user from the Web server 800.

The information providing center 900 transmits the schedule information received from the Web server to the communication unit 608 via the wireless communication network 700.

The communication unit 408 receives the schedule information from the information providing center 900 and outputs the received schedule information to the controller 607.

The controller 407 receives the schedule information from the communication unit 608 (S63). The controller determines whether or not there is a schedule and/or scheduled event for a current date (today) in the received schedule information (S64). Here, the controller 407 may receive only the schedule and/or scheduled event matched to the current date from the information providing center 900.

When there is a schedule and/or scheduled event matched to the current date in the received schedule information, the controller 407 outputs the schedule and/or scheduled event to the display unit 605 and/or the TTS conversion unit 609.

The display unit 605 displays the schedule and/or scheduled event on the screen. The TTS conversion unit 609 converts characters corresponding to the schedule and/or scheduled event into a sound, and outputs the converted sound via the voice output unit 606 (S65). Namely, the controller 607 notifies the user about the schedule and/or scheduled event matched to the current date via the display unit 605 and/or the voice output unit 606.

In step S63, the controller 407 can also compare version information of the pre-stored schedule with version information of the schedule from the information providing center 900. If the version of the schedule from the information providing center 900 is newer than the version of the pre-stored schedule, the controller 407 can either automatically download the newer version, or can display a visual or audio prompt asking the user to instruct the controller 407 to download the newer version of the schedule.

A vehicle navigation apparatus according to a seventh embodiment of the present invention will now be described in detail with reference to FIGS. 12 to 15.

Figure 12:
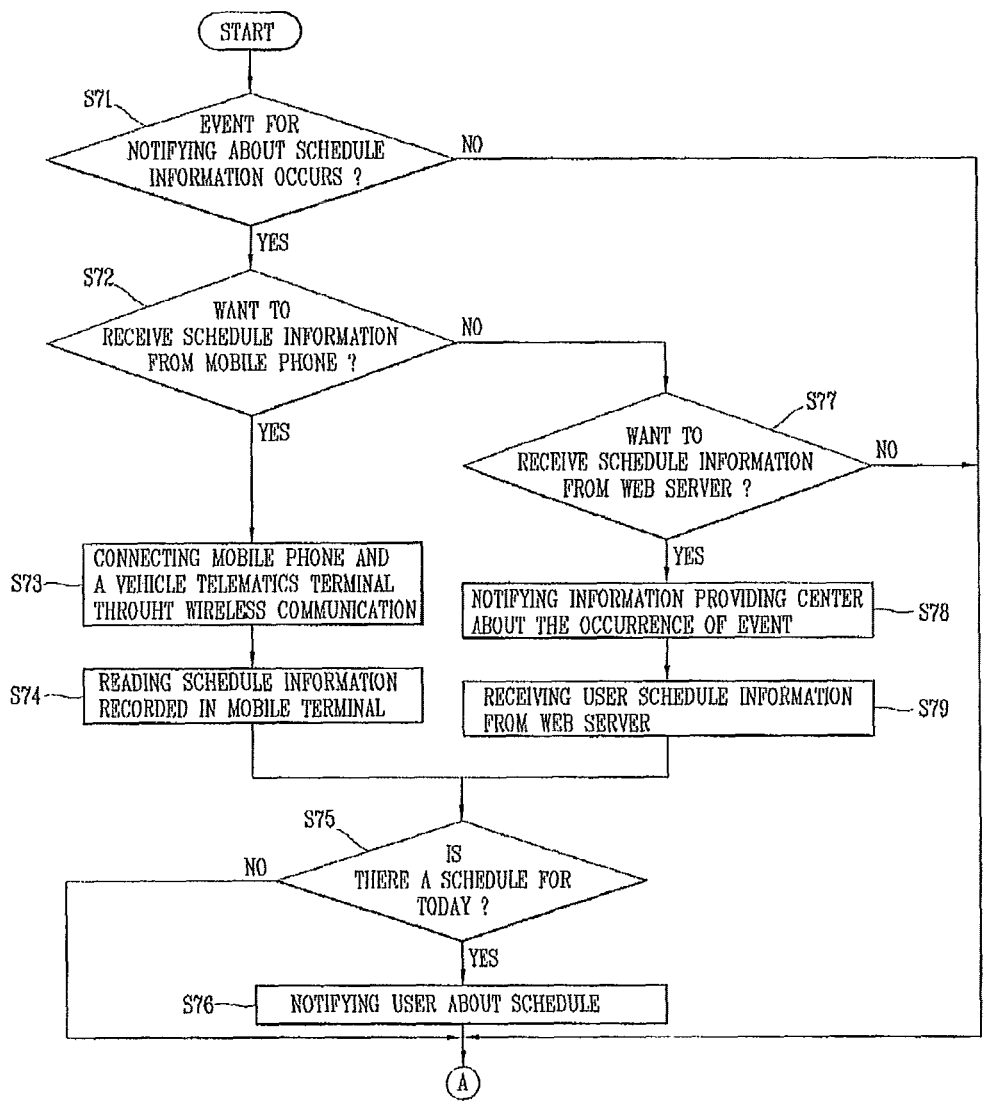
FIGS. 12 and 13 are flow charts illustrating the process of a vehicle navigation method according to a seventh embodiment of the present invention.
Figure 13:
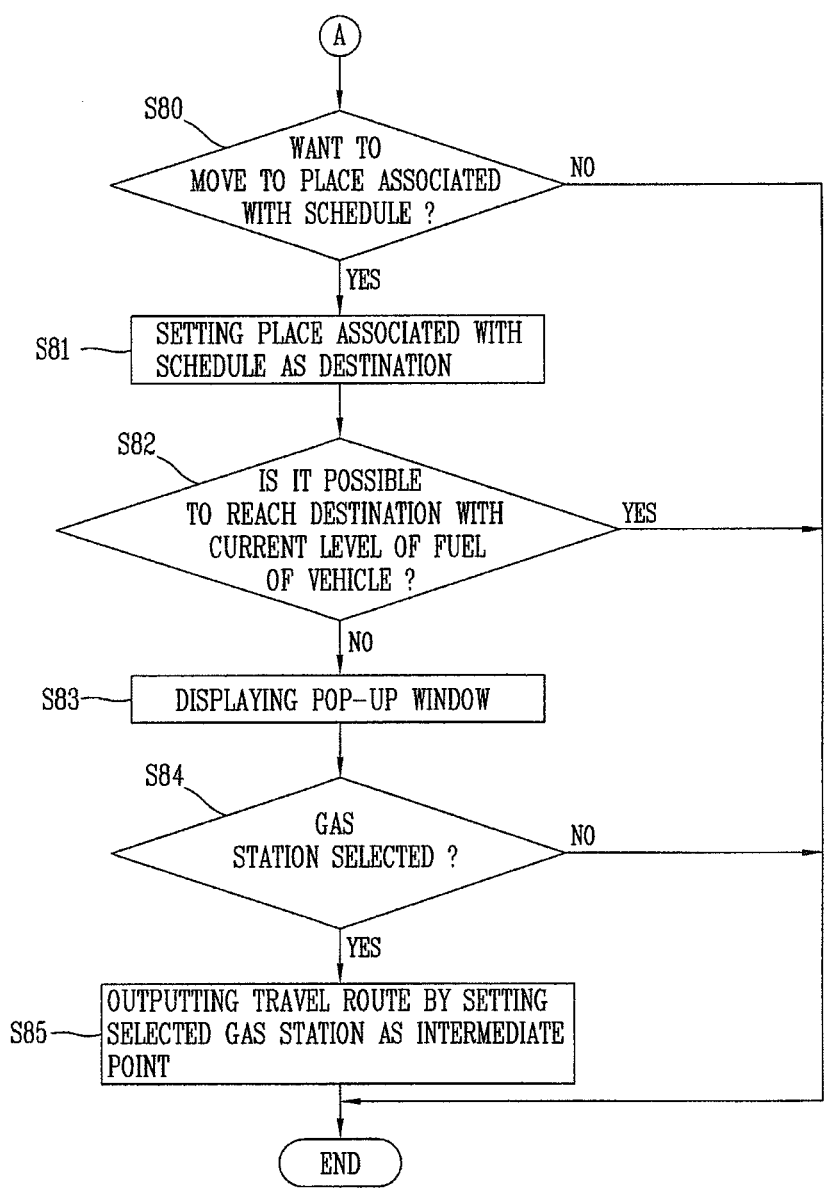

FIGS. 12 and 13 are flow charts illustrating the process of the vehicle navigation method according to the seventh embodiment of the present invention.

First, the controller 607 determines whether or not an event for notifying about schedule information occurs (S71).

When an event for notifying about the schedule information occurs, the controller 607 generates a pop-up window (not shown) (or a text message) requesting whether to receive the schedule information from the mobile phone 100 or from the Web server 800, and outputs the generated pop-up window to the display unit 605 (S72). The display unit 605 displays the pop-up window on the screen.

When an OK key (configuration key) (not shown) for receiving the schedule information from the mobile phone 100 is selected from the pop-up window, the controller 607 connects the communication unit 608 and the mobile phone 100 via the wireless communication network (e.g., Bluetooth) (S73).

When the communication unit 608 and the mobile phone 100 are connected, the controller 407 reads the schedule information from the mobile phone 100 via the communication unit 608 (S74).

The controller 607 determines whether or not there is a schedule and/or scheduled event for the current date (today) in the received schedule information (S75). If there is a schedule and/or scheduled event matched to the current date in the received schedule information, the controller 607 outputs the schedule and/or scheduled event to the display unit 605 and/or the TTS conversion unit 609. Namely, the controller 607 notifies the user about the schedule and/or scheduled event matched to the current date via the display unit 605 and/or the voice output unit 606 (S76).

Thereafter, the controller 607 determines whether or not there is location information (place associated with the schedule and/or scheduled event) in the schedule and/or scheduled event for the current date, and if there is any location information, the controller 607 generates a pop-up window for asking whether the user wants to move a destination of the vehicle to the place corresponding to the location information (S80).

Figure 14:
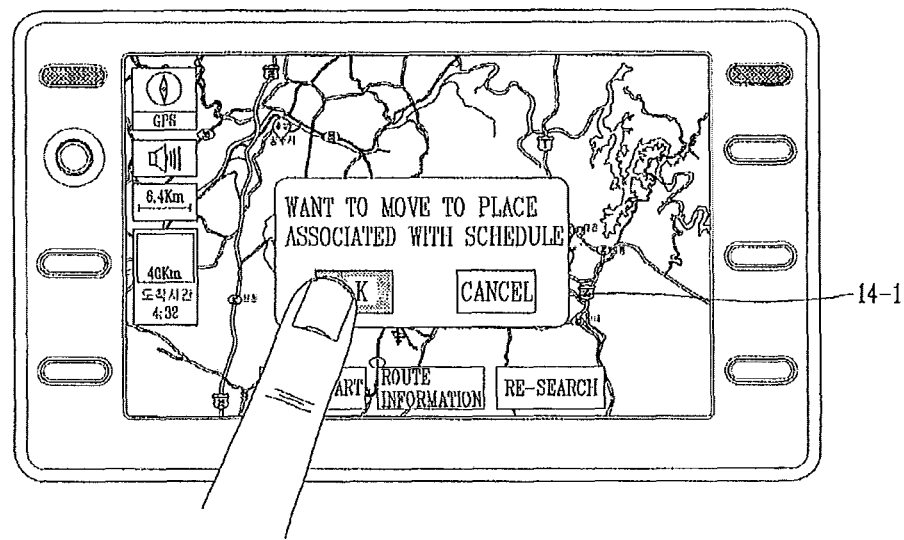
FIG. 14 is an overview of a display screen illustrating a pop-up window for moving to a place associated with a schedule according to the seventh embodiment of the present invention.

FIG. 14 shows the pop-up window for moving to the place associated with the schedule according to the seventh embodiment of the present invention.

As shown in FIG. 14, the controller 607 detects location information (place associated with a schedule) from a schedule and/or scheduled event for a current date (today), and generates a pop-up window 14-1 asking whether the user wants to move to the place corresponding to the location information in order to se the place corresponding to the detected location information as a destination of the vehicle. For example, if there is a scheduled event 'Time: 2:00 p.m., Place: Jamsil Ball Park' in the schedule for the current date, the controller 607 detects the location information (Jamsil Ball Park) recorded in a place item, generates a pop-up window (or a text message) of 'Want to set destination of vehicle as Jamsil Ball Park?' based on the detected location information, and displays the generated pop-up window on the screen via the display unit 605. Here, if there are several events with location information in the schedule for the current date, the controller 607 may sequentially generate the pop-up windows for setting the destination of the vehicle according to the prescribed order.

When the OK key is selected on the pop-up window 14-1 by the user, the controller 607 sets the place recorded in the scheduled event for the current date as the destination (S81).

Thereafter, the controller 607 determines whether or not the vehicle can travel from the current location of the vehicle to the destination with the current amount of fuel of the vehicle. For example, if the fuel efficiency of the vehicle is 10 km/1 liter, the distance from the current location of the vehicle to the destination (e.g., the place recorded in the schedule) is 100 km, and the remaining amount of fuel of the vehicle is 5 liters, the vehicle can travel up to 50 km. Thus, the controller 607 determines whether or not the vehicle can travel from the current location of the vehicle to the destination with the current amount of fuel of the vehicle based on the fuel efficiency of the vehicle, the distance from the current location to the destination of the vehicle, and the current amount of the vehicle (S82).

If it is not possible for the vehicle to travel from the current location of the vehicle to the destination with the current amount of the vehicle, the controller displays a pop-up window providing the corresponding information on the screen (S83).

Figure 15:
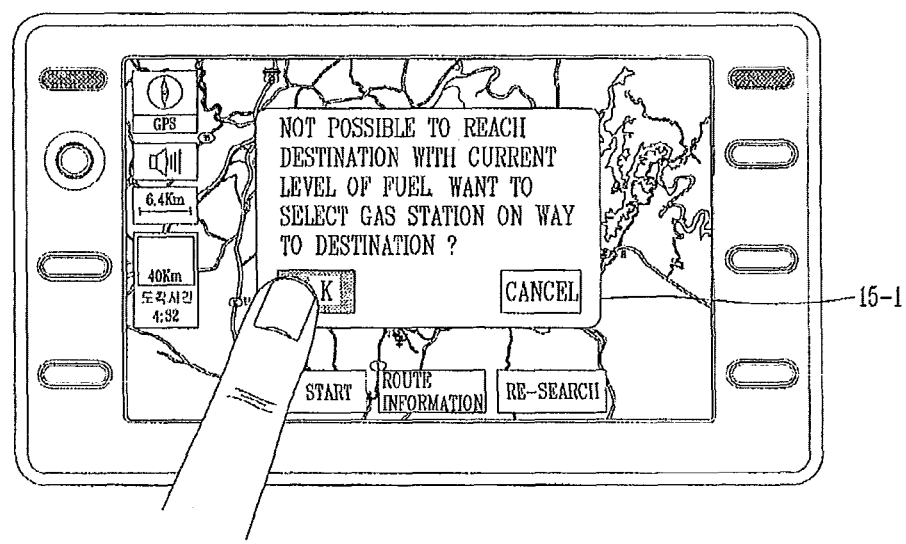
FIG. 15 is an overview of a display screen illustrating graphic information of a pop-up window according to the seventh embodiment of the present invention.

FIG. 15 shows graphic information showing a pop-up window according to the seventh embodiment of the present invention.

As shown in FIG. 15, if the vehicle cannot travel from its current location to the destination with the current amount of fuel, the controller 607 reads a pop-up window 15-1 providing the corresponding information from the storage unit 604, and displays the read pop-up window 15-1 on the screen. Here, as well as informing that the vehicle cannot travel to the destination with the current amount of fuel, the controller 607 detects gas stations to which the vehicle can travel from the current location on the travel route from the current location to the destination from the map data stored in the storage unit 604, and displays the detected gas stations in the order starting from a gas station located at the shortest distance on the screen.

The controller 607 determines whether or not a particular gas station is selected from among the gas stations displayed on the screen (S84).

When a particular gas station is selected by the user, the controller 607 automatically sets the selected gas station as an intermediate point and outputs a travel route (road guidance information) (S85).

When the OK key (not shown) for receiving the schedule information from the Web server 800 is selected (S77), the controller transmits a notification signal informing that the corresponding event has occurred to the information providing center 900 via the wireless communication network 700.

The information providing center 900 is connected to the Web server 800 via a fixed line communication network or the wireless communication network 700 based on the notification signal, and receives the schedule information recorded by the user from the Web server 800.

The information providing center 900 transmits the schedule information received from the Web server to the communication unit 608 via the wireless communication network 700.

The communication unit 608 receives the schedule information from the information providing center 900 and outputs the received schedule information to the controller 607.

The controller 607 receives the schedule information from the communication unit 608.

Thereafter, the controller 607 performs steps S75, S76, and S80 to S85. Here, the steps S75, S76, and S80 to S85 have been described above, so its description will be omitted.

As so far described, the vehicle navigation method and apparatus according to the embodiments of the present invention have the following advantages.

That is, first, when the user gets into the vehicle and if there is a schedule and/or scheduled event for a current date, the schedule and/or scheduled event is informed to the user, to thereby accurately and effectively notify the user about the schedule information.

Second, when the user gets into the vehicle and if there is location information for the schedule and/or scheduled event for the current date, a place corresponding to the location information can be set as a destination.

Third, when the user gets into the vehicle but the vehicle cannot travel to the place recorded in the schedule and/or scheduled event for the current date with the current amount of fuel, a gas station within an area to which the vehicle can travel from the current location of the vehicle can be set as an intermediate point.

The navigation method and apparatus of the mobile terminal according to the embodiments of the present invention may be also applicable to mobile terminal such as personal digital assistants (PDAs), portable multimedia players (PMPs), or the like, as well as to the telematics terminal or the mobile terminal.

The navigation method and apparatus of the mobile terminal according to the embodiments of the present invention may be applied to any type of vehicle such as an automobile, a truck, a bus, a boat, or another vehicle.

In summary, there is disclosed a device and method for determining that a predetermined vehicle event has occurred; receiving a schedule based upon the step of determining; and issuing an alert by the navigation device that a scheduled event has passed, is occurring or will occur within a predetermined time.

As the present invention may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A method of managing a schedule of one or more events in a navigation device of a vehicle, comprising:
   determining by the navigation device that a predetermined vehicle event has occurred;
   receiving the schedule by the navigation device based upon the step of determining;
   issuing an alert for a scheduled event, by the navigation device, if the scheduled event on the day in which the predetermined vehicle event has occurred is in the received schedule;
   detecting, by the navigation device, location information associated with the scheduled event from the received schedule;
   displaying, by the navigation device, information inquiring as to whether to guide a travel route from a current location of the vehicle to a location corresponding to the location information associated with the scheduled event on the day; and
   setting the detected location information as a destination in response to the displayed information,
   wherein the step of receiving the schedule comprises:
   displaying a message asking whether to receive the schedule from one of a mobile communication terminal and a remote server if the predetermined vehicle event has occurred;
   receiving a user selection to receive the schedule from the one of the mobile communication terminal and the remote server; and
   wirelessly transmitting a request to receive the schedule from the one of the mobile communication terminal and the remote server.

2. The method of claim 1, wherein the predetermined vehicle event comprises one of
   a vehicle start; and
   a vehicle door operation.

3. The method of claim 1, wherein the step of receiving the schedule comprises wirelessly receiving the schedule from the one of the mobile communication terminal and the remote server.

4. The method of claim 1, wherein the step of determining by the navigation device that a predetermined vehicle event has occurred comprises wirelessly transmitting a corresponding notification from the navigation device to the one of the mobile communication terminal and the remote server.

5. The method of claim 1, wherein the step of setting the detected location information comprises:
   automatically setting the detected location information as the destination.

6. The method of claim 5, further comprising:
   detecting an amount of fuel in the vehicle;
   determining if the vehicle can reach the destination without refueling; and
   if the vehicle is determined to be unable to reach the destination without refueling, displaying location information of a refueling station.

7. The method of claim 6, wherein the step of displaying location information of a refueling station comprises:
displaying location information about a refueling station within a predetermined distance of a travel route from a current location of the vehicle to the destination.

8. The method of claim 6, further comprising:
setting the selected gas station as an intermediate destination automatically or in response to a user selection.

9. The method of claim 1, wherein the step of detecting the location information corresponding to the scheduled event comprises:
retrieving one of a schedule event location name, a schedule event address, and a schedule event location phone number.

10. The method of claim 1, wherein the predetermined vehicle event comprises one of
a vehicle seat belt operation;
a driver seating detection event; and
a vehicle window operation.

11. A navigation apparatus configured to be installed in a vehicle, comprising:
a communication device; and
a controller operatively connected to the communication device, the controller configured to
determine that a predetermined vehicle event has occurred,
wirelessly receive a schedule if the predetermined vehicle event is determined to have occurred,
issue an alert for a scheduled event, if the scheduled event on the day in which the predetermined vehicle event has occurred is in the received schedule,
detect location information associated with the scheduled event from the received schedule,
display information inquiring as to whether to guide a travel route from a current location of the vehicle to a location corresponding to the location information associated with the scheduled event on the day,
set the detected location information as a destination in response to the displayed information,
display a message asking whether to receive the schedule from one of a mobile communication terminal and a remote server if the predetermined vehicle event has occurred,
receive a user selection to receive the schedule from the one of the mobile communication terminal and the remote server, and
wirelessly transmit a request to receive the schedule from the one of the mobile communication terminal and the remote server.

12. The navigation apparatus of claim 11, wherein the predetermined vehicle event comprises one of
a vehicle start; and
a vehicle door operation.

13. The navigation apparatus of claim 11, wherein the communication device is configured to wirelessly receive the schedule from the one of the mobile communication terminal and the remote server.

14. The navigation apparatus of claim 11, wherein the communication device is configured to wirelessly transmit a corresponding notification from the navigation device to the one of the mobile communication terminal and the remote server.

15. The navigation apparatus of claim 11, wherein the controller is configured to:
automatically set the detected location information as the destination.

16. The navigation apparatus of claim 15, wherein the controller is configured to:
detect an amount of fuel in the vehicle;
determine if the vehicle can reach the destination without refueling; and
if the vehicle is determined to be unable to reach the destination without refueling, display location information of a refueling station.

17. The navigation apparatus of claim 16, wherein the controller is configured to:
display location information about a refueling station within a predetermined distance of a travel route from a current location of the vehicle to the destination.

18. The navigation apparatus of claim 16, wherein the controller is configured to:
set the selected gas station as an intermediate destination automatically or in response to a user selection.

19. The navigation apparatus of claim 11, wherein the controller is configured to:
retrieve one of a schedule event location name, a schedule event address, and a schedule event location phone number.

20. The navigation apparatus of claim 11, wherein the predetermined vehicle event comprises one of
a vehicle seat belt operation;
a driver seating detection event; and
a vehicle window operation.

21. A vehicle, comprising:
a navigation apparatus including
a communication device, and
a controller operatively connected to the communication device, the controller configured to
determine that a predetermined vehicle event has occurred,
receive a schedule if the predetermined vehicle event is determined to have occurred,
issue an alert for a scheduled event, if the scheduled event on the day in which the predetermined vehicle event has occurred is in the received schedule,
detect location information associated with the scheduled event from the received schedule,
display information inquiring as to whether to guide a travel route from a current location of the vehicle to a location corresponding to the location information associated with the scheduled event on the day,
set the detected location information as a destination in response to the displayed information,
display a message asking whether to receive the schedule from one of a mobile communication terminal and a remote server if the predetermined vehicle event has occurred,
receive a user selection to receive the schedule from the one of the mobile communication terminal and the remote server, and
wirelessly transmit a request to receive the schedule from the one of the mobile communication terminal and the remote server.

* * * * *